US012668722B2

(12) United States Patent
Chen et al.

(10) Patent No.: US 12,668,722 B2
(45) Date of Patent: Jun. 30, 2026

(54) SUPRAMOLECULAR HOT MELT ADHESIVE AND PREPARATION METHOD THEREOF

(71) Applicant: NINGBO INSTITUTE OF MATERIALS TECHNOLOGY AND ENGINEERING, CHINESE ACADEMY OF SCIENCES, Ningbo (CN)

(72) Inventors: Haiming Chen, Ningbo (CN); Dongsheng Mao, Ningbo (CN)

(73) Assignee: NINGBO INSTITUTE OF MATERIALS TECHNOLOGY AND ENGINEERING, CHINESE ACADEMY OF SCIENCES, Ningbo (CN)

( * ) Notice: Subject to any disclaimer, the term of this patent is extended or adjusted under 35 U.S.C. 154(b) by 631 days.

(21) Appl. No.: 18/025,900

(22) PCT Filed: Aug. 30, 2022

(86) PCT No.: PCT/CN2022/115756
§ 371 (c)(1),
(2) Date: Mar. 12, 2023

(87) PCT Pub. No.: WO2023/197508
PCT Pub. Date: Oct. 19, 2023

(65) Prior Publication Data

US 2024/0301247 A1 Sep. 12, 2024

(30) Foreign Application Priority Data

Apr. 14, 2022 (CN) ......................... 202210390024.7

(51) Int. Cl.
*C09J 7/35* (2018.01)

(52) U.S. Cl.
CPC ........... *C09J 7/35* (2018.01); *C09J 2301/408* (2020.08); *C09J 2301/50* (2020.08)

(58) Field of Classification Search
CPC .......... C09J 7/35; C09J 175/08; C09J 175/04; C08G 18/12; C08G 18/482; C08G 18/4854; C08G 18/61; C08G 18/6685; C08G 18/73; C08G 18/758
See application file for complete search history.

(56) References Cited

U.S. PATENT DOCUMENTS

| | | | |
|---|---|---|---|
| 2004/0087755 A1 | 5/2004 | Eling et al. | |
| 2019/0249006 A1 * | 8/2019 | Ichinose .............. | C08K 5/3492 |

FOREIGN PATENT DOCUMENTS

| | | |
|---|---|---|
| CN | 1479759 A | 3/2004 |
| CN | 107325256 A | 11/2017 |
| CN | 108192069 A | 6/2018 |
| CN | 109836566 A | 6/2019 |
| CN | 110790888 A | 2/2020 |
| CN | 111484597 A | 8/2020 |
| CN | 112358622 A | 2/2021 |
| CN | 112794979 A | 5/2021 |
| CN | 112877014 B | 11/2021 |
| CN | 113817432 A | 12/2021 |
| CN | 113817433 | * 12/2021 |
| CN | 113817433 A | 12/2021 |
| CN | 114806485 A | 7/2022 |

OTHER PUBLICATIONS

Espacenet machine translation of CN113817433 description section (Year: 2021).*
Oprea Designed Monomers and Polymers Article (Year: 2010).*
First Office Action dated Jul. 17, 2023 for Chinese patent application No. 202210390024.7, English translation provided by Google Translate.
Song Yan et al., "Self-healing polymers with tunable mechanical properties", Chinese Chemical Society 2017 National Polymer Academic Paper Conference Abstract Collection—Topic A: Polymer Chemistry (2), p. 75, Oct. 10, 2017.
International Search Report for PCT/CN2022/115756 mailed Jan. 5, 2023, ISA/CN.
Shuliang Wang, el al., Strong, detachable, and self-healing dynamic crosslinked hot melt polyurethane adhesive, Materials Chemistry Frontiers, 2019, 3, 1833.
Meiyin Wu, et al., Polyurethane hot melt adhesive based on Diels-Alder reaction, International Journal of Adhesion and Adhesives, 2020. 100. 102597.

* cited by examiner

*Primary Examiner* — John M Cooney
*Assistant Examiner* — Adam J Berro
(74) *Attorney, Agent, or Firm* — Yue (Robert) Xu; Apex Attorneys at Law, LLP

(57) ABSTRACT

The present invention provides a supramolecular hot melt adhesive. The present application also provides a method for preparing a supramolecular hot melt adhesive, comprising the steps of: A) dissolving a diol oligomer or diamine oligomer in a solvent, and reacting the mixture with diisocyanate under the action of a catalyst to obtain an initial reactant; B) mixing 2-amino-4-hydroxyl-6-methylpyrimidine, the initial reactant and a solvent for reaction; C) reacting the reactant obtained in step B) with a multifunctional crosslinking agent to obtain the supramolecular hot melt adhesive. The preparation method of the present invention constructs a supramolecular material with excellent strength, toughness and self-healing ability by a synergistic effect of multiple hydrogen bonds between carbamate or ureido group and pyrimidine group. The effective control of performance of materials can be realized by changing the chemical composition of supramolecular arms, the content of single-capping agent and the functionality of crosslinking agent.

9 Claims, 8 Drawing Sheets

SUPRAMOLECULAR HOT MELT ADHESIVE AND PREPARATION METHOD THEREOF

CROSS REFERENCE TO RELATED APPLICATIONS

This application is the national phase of International Application No. PCT/CN2022/115756, titled "SUPRAMOLECULAR HOT MELT ADHESIVE AND PREPARATION METHOD THEREOF", filed on Aug. 30, 2022, which claims the priority to Chinese Patent Application No. 202210390024.7, titled "SUPRAMOLECULAR HOT MELT ADHESIVE AND PREPARATION METHOD THEREOF", filed on Apr. 14, 2022 with the China National Intellectual Property Administration, which are incorporated herein by reference in entirety.

FIELD

The present invention relates to the field of polymer materials and supramolecular materials, and in particular to a supramolecular hot melt adhesive and a preparation method thereof.

BACKGROUND

Hot melt adhesives can be divided into thermosetting hot melt adhesives and thermoplastic hot melt adhesives according to their curing process. Thermosetting hot melt adhesive is usually liquid or solid-like at room temperature. After being heated and cured by a chemical reaction, it has the advantages of high binding strength, good heat resistance and corrosion resistance. However, it is usually for one-time use, and cannot be processed repeatedly. Thermoplastic hot melt adhesive is usually solid at room temperature. After being heated to a liquid, it is coated to fully bind to an adherend, which obtains a high initial binding strength after cooled, and can be reused. However, it has a low upper limit of strength. In order to combine the respective advantages of the two, hot melt adhesive containing dynamic chemical bonds has been favored by researchers.

Dynamic chemical bonds can be divided into dynamic covalent bonds and non-covalent interactions. The former has been mostly reported in literature (Mater. Chem. Front. 2019, 3, 1833.; Int. J. Adhes. Adhes. 2020. 100. 102597), but it usually has low binding strength. The latter common non-covalent interaction units include but are not limited to van der Waals forces, hydrogen bonds, ionic bonds, and host-guest interactions. Such interactions are sensitive to external stimuli, so that effective control of combination and dissociation can be achieved by inputting energies such as heat and light, and reuse for multiple times can be realized. However, since the binding energy of non-covalent interactions is lower than that of covalent bonds, the main body structure of hot melt adhesives is easily destroyed when stress is transmitted at the interface of the adherend and inside the adhesive, resulting in limited improvement of the binding strength. More importantly, it is difficult for the currently reported hot melt adhesives to achieve self-healing (CN112877014B, 2021, 1, 16), and they cannot eliminate static crack in time when it occurs, thus shortening the service life of hot melt adhesives to a certain extent.

Therefore, in order to meet the needs of practical use, it is necessary to develop a class of hot melt adhesive material with high strength, super toughness, and self-healing ability, which can eliminate cracks in static state and hinder crack development in dynamic state to the greatest extent, thereby improving its comprehensive service performance.

SUMMARY

The technical problem solved by the present invention is to provide a supramolecular hot melt adhesive. The polymer hot melt adhesive provided by the present application has high strength, super toughness and self-healing ability.

In view of this, the present application provides a supramolecular hot melt adhesive as shown in formula (I), (I)

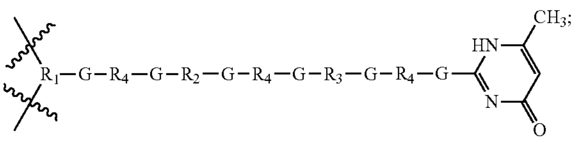

wherein, $R_1$ is a group of multifunctional crosslinking agent other than hydrogen;

G is a ureido group or a carbamate group;

$R_2$ and $R_3$ are groups of either or both of diamine oligomer and diol oligomer other than amino or/and hydrogen, and $R_2$ and $R_3$ can be the same or different;

$R_4$ is a group of diisocyanate other than an isocyanate group.

The present application also provides a method for preparing a supramolecular hot melt adhesive, comprising the steps of:

A) dissolving a diol oligomer or diamine oligomer in a solvent, and subjecting the mixture to react with diisocyanate under the action of a catalyst to obtain an initial reactant;

B) mixing 2-amino-4-hydroxyl-6-methylpyrimidine, the initial reactant and a solvent for reaction;

C) subjecting the reactant obtained in step B) to react with a multifunctional crosslinking agent to obtain a supramolecular hot melt adhesive.

Preferably, the diol oligomer is selected from the group consisting of polycaprolactone diol, polytetrahydrofuran diol, double hydroxyl terminated polyethylene glycol, double hydroxyl terminated polypropylene glycol, double hydroxyl terminated polydimethylsiloxane and a mixture thereof, and has a number-average molecular weight of 200-5000 g/mol; the diamine oligomer is selected from the group consisting of polyetheramine, double amino terminated polydimethylsiloxane and a mixture thereof, and has a number-average molecular weight of 200-5000 g/mol; the isocyanate is selected from the group consisting of isophorone diisocyanate, hexamethylene diisocyanate, trimethylhexadimethyl diisocyanate, dicyclohexyl methane 4,4'-diisocyanate, p-phenylene diisocyanate, toluene diisocyanate and a mixture thereof; and a molar ratio of the diol compound or diamine compound to the diisocyanate is (1-20):(2-21).

Preferably, in step A), the catalyst is selected from dibutyltin dilaurate, and an amount of the catalyst is equal to or less than 1 wt % of the raw material in the reaction in step A).

Preferably, a molar ratio of the 2-amino-4-hydroxyl-6-methylpyrimidine to the diol oligomer or diamine oligomer is (0.05-10):(0.1-20).

Preferably, the multifunctional crosslinking agent has a functionality of ≥3, and it is selected from the group consisting of tris(2-aminoethyl)amine, melamine, glycerol, 2-hydroxyl-N,N-bis(2-hydroxyethyl)-N-methylethylammonium methyl sulfate and a mixture thereof.

Preferably, a molar ratio of the multifunctional crosslinking agent to the diol oligomer or the diamine oligomer is (0.01-5):(1-20).

Preferably, in step A), the solvent is selected from the group consisting of N,N'-dimethylformamide, N,N'-dimethylacetamide, tetrahydrofuran and a mixture thereof, and the reaction is carried out at 40-100° C. for 5-120 min.

Preferably, in step B), the reaction is carried out at 40-100° C. for 1-3 h.

Preferably, in step C), the reaction is carried out at 40-100° C. for 6-12 h.

The present application provides a supramolecular hot melt adhesive, which is a supramolecular hot melt adhesive with excellent strength, toughness and self-healing ability constructed through a synergistic effect of multiple hydrogen bonds between carbamate or ureido group and pyrimidine group. Further, in the process of preparation, effective control of performance of materials can be realized by changing the chemical composition of supramolecular arms, the content of single-capping agent and the functionality of cross-linking agent. The experimental results show that the supramolecular hot melt adhesive material of the present invention can reach a tensile strength of 20 MPa, an elongation rate at break of more than 1000%, a self-healing rate of 90%, and a binding strength to adherends such as stainless steel and iron of more than 10 MPa. At 100° C., the supramolecular hot melt adhesive may be heating-processed into various setting shapes, showing good shape plasticity, mechanical performance, and self-healing performance.

DETAILED DESCRIPTION

Figure 1:
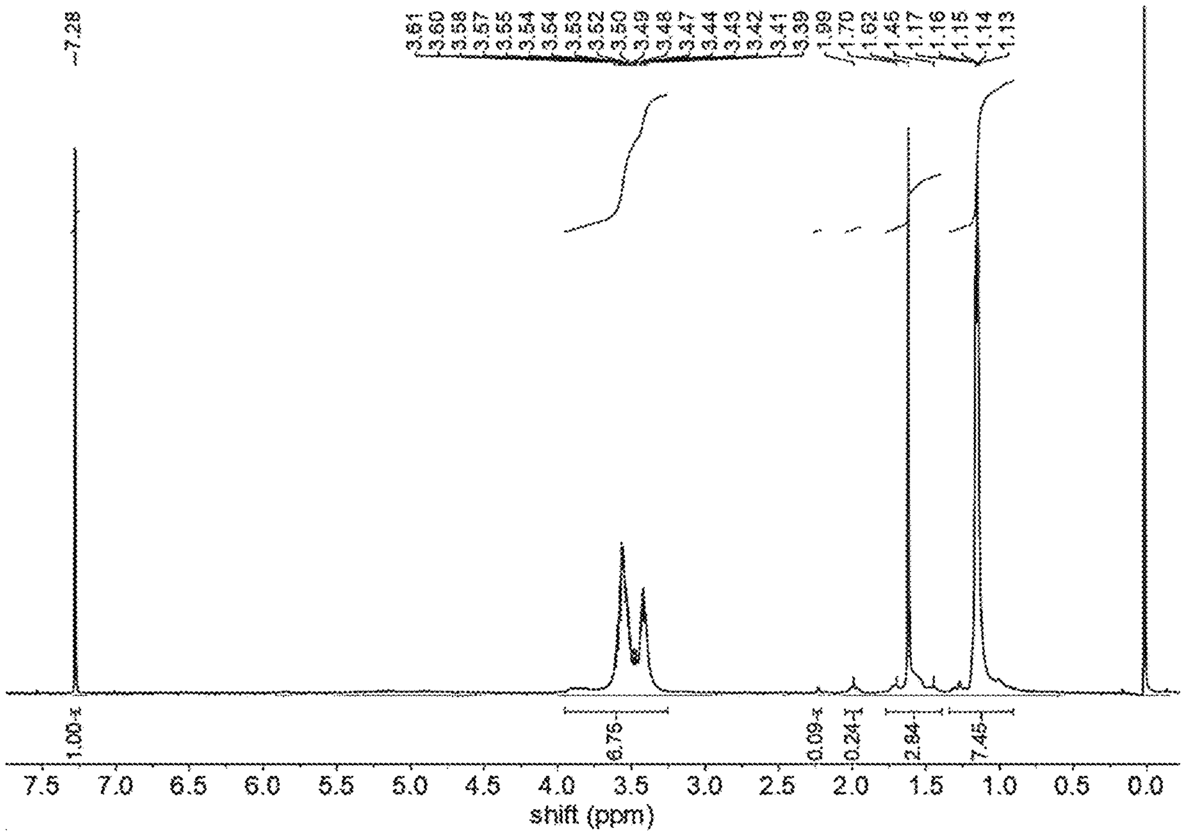
FIG. 1 is the NMR hydrogen spectrum of the hot melt adhesive prepared in Example 1 of the present invention.

In order to further understand the present invention, the preferred embodiments of the present invention are described below in conjunction with examples, but it should be understood that these descriptions are only to further illustrate the features and advantages of the present invention, rather than limiting the claims of the present invention.

In view of the lack of balance among the strength, self-healing ability and fracture toughness of hot melt adhesive materials in the prior art, the present application provides a supramolecular hot melt adhesive and a preparation method thereof. According to a strategy of self-assembly of raw materials and a synergistic effect of various non-covalent interactions, a hot melt adhesive with high strength, super toughness, and self-healing ability is prepared by using carbamate and/or ureido group and/or carbamate-ureido group to regulate the density of hydrogen bonds, realizing effective regulation of the comprehensive performance of materials. Specifically, the examples of the present invention disclose a supramolecular hot melt adhesive as shown in formula (I), (I)

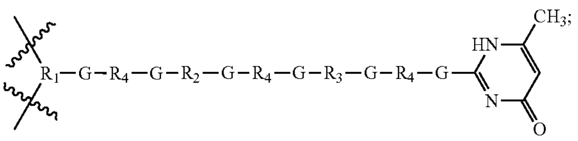

wherein, $R_1$ is a group of multifunctional crosslinking agent other than hydrogen;

G is a ureido group or a carbamate group;

$R_2$ and $R_3$ are groups of either or both of diamine oligomer and diol oligomer other than amino or/and hydrogen, and $R_2$ and $R_3$ can be the same or different;

$R_4$ is a group of diisocyanate other than an isocyanate group.

In the supramolecular hot melt adhesive provided in the present application, ~~~~ represents the other two groups connected to $R_1$, the structure of which is the same as the group connected to the right side of $R_1$ in formula (I).

In the above-mentioned supramolecular hot melt adhesive, in a case that $R_2$ and $R_3$ are the same, they are groups of diamine oligomer or diol oligomer other than amino or hydrogen; in a case that $R_2$ and $R_3$ are different, for example, $R_2$ is a group of diamine oligomer other than amino, and $R_3$ is a group of diol oligomer other than hydrogen.

Note: The above "other than" does not refer to the removal of a certain group after a specific reaction, but refers to the removal of a certain group from the raw material.

Specifically, the present application also provides a method for preparing a supramolecular hot melt adhesive, comprising the steps of:

A) dissolving a diol oligomer or diamine oligomer in a solvent, and subjecting the mixture to react with diisocyanate under the action of a catalyst to obtain an initial reactant;

B) mixing 2-amino-4-hydroxyl-6-methylpyrimidine, the initial reactant and a solvent for reaction;

C) subjecting the reactant obtained in step B) to react with a multifunctional crosslinking agent to obtain the supramolecular hot melt adhesive.

In the present application, during the preparation process of the supramolecular hot melt adhesive, a diol oligomer or diamine oligomer are firstly dissolved in a solvent, and the mixture is removed off air bubbles, and then added with a catalyst and diisocyanate for reaction at 40-100° C. for 5-120 min to obtain an oligomer with isocyanate at both ends. The diol oligomer includes but is not limited to the group consisting of polycaprolactone diol, polytetrahydrofuran diol, double hydroxyl terminated polyethylene glycol, double hydroxyl terminated polypropylene glycol, double hydroxyl terminated polydimethylsiloxane and a mixture thereof, and has a number-average molecular weight of 200-5000 g/mol. The diamine oligomer is selected from the group consisting of polyetheramine (D2000, D400, D230), double amino terminated polydimethylsiloxane and a mixture thereof, and has a number-average molecular weight of 200-5000 g/mol. The isocyanate is selected from the group consisting of isophorone diisocyanate, hexamethylene diisocyanate, trimethylhexadimethyl diisocyanate, dicyclohexyl methane 4,4'-diisocyanate, p-phenylene diisocyanate, toluene diisocyanate and a mixture thereof. A molar ratio of the diol compound or diamine compound to the diisocyanate is (1-20):(2-21). In the present application, the diamine oligomer in the above reaction is preferably two kinds of diamine oligomers, and a molar ratio of the two diamine oligomers to the diisocyanate is (1-10):(1-10):(2-21). More specifically, a molar ratio of the two diamine oligomers to the diisocyanate is (2-5):(2-5):(3-11). The catalyst is dibutyltin dilaurate, and the solvent is selected from the group consisting of N,N'-dimethylformamide, N,N'-dimethylacetamide, tetrahydrofuran and a mixture thereof.

In the present application, then 2-amino-4-hydroxyl-6-methylpyrimidine, the initial reactant and a solvent are mixed for reaction. During this process, the 2-amino-4-hydroxyl-6-methylpyrimidine realizes unidirectional capping on supramolecular arms of the initial reactant. A molar ratio of the 2-amino-4-hydroxyl-6-methylpyrimidine to the diol oligomer or diamine oligomer is (0.05-10):(0.1-20). More specifically, in a case that the diamine oligomer is selected from two kinds of diamine oligomers, a molar ratio of the 2-amino-4-hydroxyl-6-methylpyrimidine to the two diamine oligomers is (0.1-5):(2-5):(2-5). The reaction is carried out at 40-100° C. for 1-3 h.

According to the present invention, then the reactant obtained above is subjected to react with a multifunctional crosslinking agent to obtain a supramolecular hot melt adhesive. In this process, the unidirectionally-capped supramolecular arms obtained above are cross-linked using the multifunctional crosslinking agent. The multifunctional crosslinking agent has a functionality of ≥3, and it is selected from the group consisting of tris(2-aminoethyl)amine, melamine, glycerol, 2-hydroxyl-N,N-bis(2-hydroxyethyl)-N-methylethylammonium methyl sulfate and a mixture thereof. A molar ratio of the multifunctional crosslinking agent to the diol oligomer or the diamine oligomer is (0.01-5):(1-20). More specifically, a molar ratio of the multifunctional crosslinking agent to the diol oligomer or the diamine oligomer is (1-3):(5-18).

In the above preparation process, by adjusting the chemical composition of supramolecular arm, a supramolecular arm based on the interaction of multiple hydrogen bonds is obtained. The multiple hydrogen bonds provide the hot melt adhesive with higher strength and greatly improve the comprehensive toughness of the hot melt adhesive. The supramolecular hot melt adhesive weakens the physical entanglement between molecular chains, making the diffusion process of molecular chains no longer a bottleneck for the material self-healing, and greatly improving the self-healing ability of hot melt adhesives. The different chemical compositions of supramolecular arms lead to different strengths of interactions between supramolecules. The ratio of various diols and/or diamines directly affects the length of cross-linked supramolecular arms, the number of end groups, and the cross-linking density. Therefore, controlling the chemical composition of supramolecular arms can realize the effective control of the performance of supramolecular hot melt adhesive materials.

The experimental results show that the supramolecular hot melt adhesive prepared by the present invention may exhibit the typical features of thermoplastic elastomers, and reach a tensile strength of 20 MPa, an elongation rate at break of more than 1000%, a self-healing rate of 90%, and a binding strength to adherends such as stainless steel and iron of more than 10 MPa. At 100° C., the supramolecular hot melt adhesive may be heating-processed into various setting shapes, showing good shape plasticity, mechanical performance, and self-healing performance.

In order to further understand the present invention, the supramolecular hot melt adhesive provided by the present invention and the preparation method thereof will be described in detail below in conjunction with the examples, and the protection scope of the present invention is not limited by the following examples.

Example 1

A method for preparing a supramolecular hot melt adhesive material with high strength, super toughness, and self-healing ability comprises the following steps:

S1. D2000 and D400 were completely dissolved in N,N'-dimethylformamide, and the mixture was removed off air bubbles, and then added with a small amount of catalyst and an excess amount of dicyclohexyl methane 4,4'-diisocyanate for reaction at 60° C. for 30 min to obtain an oligomer with isocyanate at both ends;

S2. 2-amino-4-hydroxyl-6-methylpyrimidine was dissolved in N,N'-dimethylformamide, and then the mixture was added to the S1 solution to react with isocyanate at a temperature consistent with S1 for 2 h;

S3. Tris(2-aminoethyl)amine was added to the S2 solution to react with isocyanate at a temperature consistent with S2 for 6 h;

S4. After the reaction of S3 was completed, the solution was poured into a mold, and the solvent was fully volatilized to obtain a supramolecular thermoplastic elastomer material with super toughness and self-healing ability;

wherein, in S1, a molar ratio of D2000 to D400 was 1:3;

wherein, in S1, a molar ratio of the sum of the amount of substance of D2000 and D400 to the dicyclohexyl methane 4,4'-diisocyanate was 4:5;

wherein, in S2, a molar ratio of the 2-amino-4-hydroxyl-6-methylpyrimidine to the sum of the amount of substance of D2000 and D400 was 1:4;

wherein, in S3, a molar ratio of the tris(2-aminoethyl) amine to the sum of the amount of substance of D2000 and D400 was 1:12.

The supramolecular hot melt adhesive obtained in this example has a molecular formula shown as follows:

S4. After the reaction of S3 was completed, the solution was poured into a mold, and the solvent was fully volatilized to obtain a supramolecular thermoplastic elastomer material with super toughness and self-healing ability;

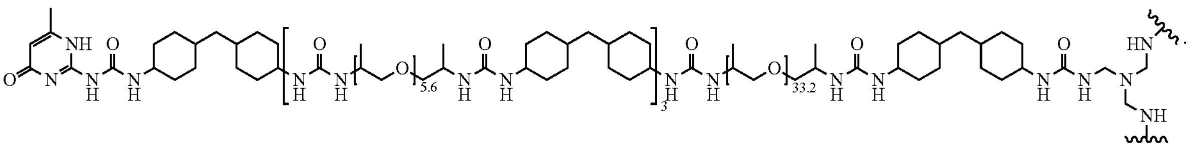

Figure 12:
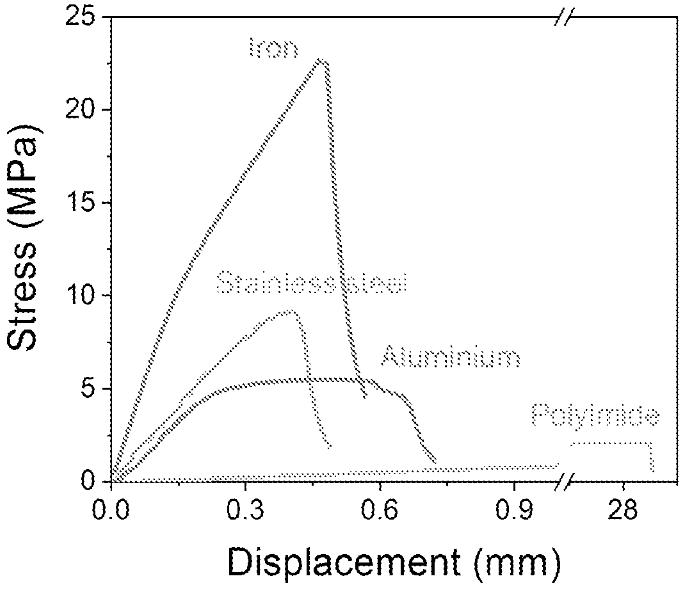
FIG. 12 is the Lap-shear stress-strain curve of the hot melt adhesive prepared in Example 1 of the present invention after being bound with iron sheet, stainless steel, aluminum, and polyimide.
Figure 14:
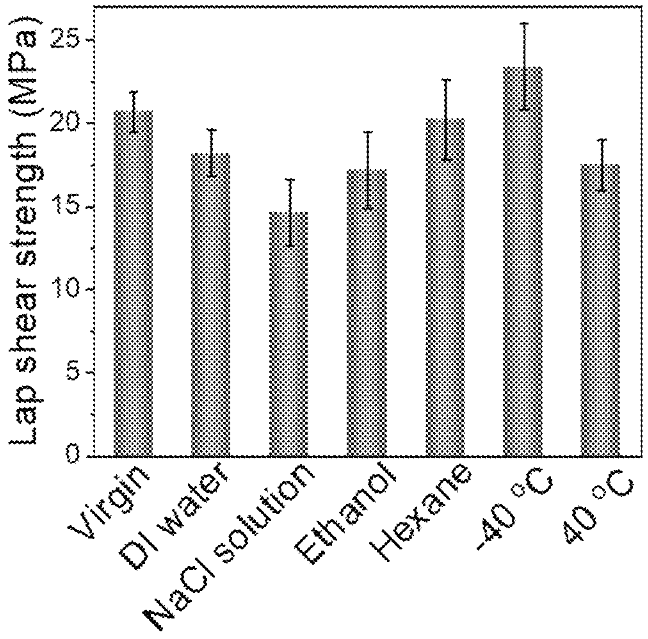
FIG. 14 shows the Lap-shear strength of the hot melt adhesive prepared in Example 1 of the present invention after being bound to iron sheet, soaked and processed in different environments for one week.

FIG. 1 is the NMR hydrogen spectrum of the hot melt adhesive prepared in this example, and FIG. 12 is the Lap-shear stress-strain curve of the hot melt adhesive prepared in this example after being bound with iron sheet, stainless steel, aluminum, and polyimide. It can be seen from FIG. 12 that all the bound samples can withstand deformation to a certain extent before broken, which showed obvious toughness fracture behavior, indicating that the hot melt adhesive of this example had excellent toughness. In addition, the hot melt adhesive bound with iron sheet or stainless steel had a binding strength of greater than 10 MPa, especially the one bound with iron sheet had a binding strength as high as 22 MPa, showing excellent binding ability. FIG. 14 is the Lap-shear strength of the hot melt adhesive prepared in this example after being bound to iron sheet, soaked and processed in different environments for one week. It can be seen from FIG. 14 that the hot melt adhesive of this example had extremely strong environmental stability, and may maintain excellent binding ability after being soaked in various solvents such as deionized water, sodium chloride aqueous solution, ethanol, and n-hexane for a long time. In addition, in a test at ambient temperatures of 40° C. and −40° C., the binding ability of the hot melt adhesive did not reduce but enhanced, further demonstrating that the hot melt adhesive of this example had excellent binding ability.

Example 2

A method for preparing a supramolecular hot melt adhesive material with high strength, super toughness, and self-healing ability comprises the following steps:

S1. D2000 and D400 were completely dissolved in N,N'-dimethylformamide, and the mixture was removed off air bubbles, and then added with a small amount of catalyst and an excess amount of dicyclohexyl methane 4,4'-diisocyanate for reaction at 60° C. for 30 min to obtain an oligomer with isocyanate at both ends;

S2. 2-amino-4-hydroxyl-6-methylpyrimidine was dissolved in N,N'-dimethylformamide, and then the mixture was added to the S1 solution to react with isocyanate at a temperature consistent with S1 for 2 h;

S3. Tris(2-aminoethyl)amine was added to the S2 solution to react with isocyanate at a temperature consistent with S2 for 6 h;

wherein, in S1, a molar ratio of D2000 to D400 was 2:3;

wherein, in S1, a molar ratio of the sum of the amount of substance of D2000 and D400 to the dicyclohexyl methane 4,4'-diisocyanate was 5:6;

wherein, in S2, a molar ratio of the 2-amino-4-hydroxyl-6-methylpyrimidine to the sum of the amount of substance of D2000 and D400 was 1:5;

wherein, in S3, a molar ratio of the tris(2-aminoethyl) amine to the sum of the amount of substance of D2000 and D400 was 1:15.

The supramolecular hot melt adhesive obtained in this example has a molecular formula shown as follows:

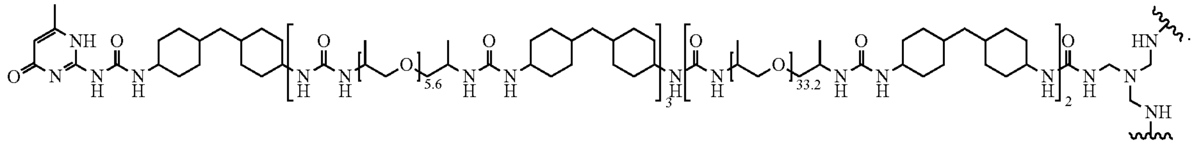

Figure 2:
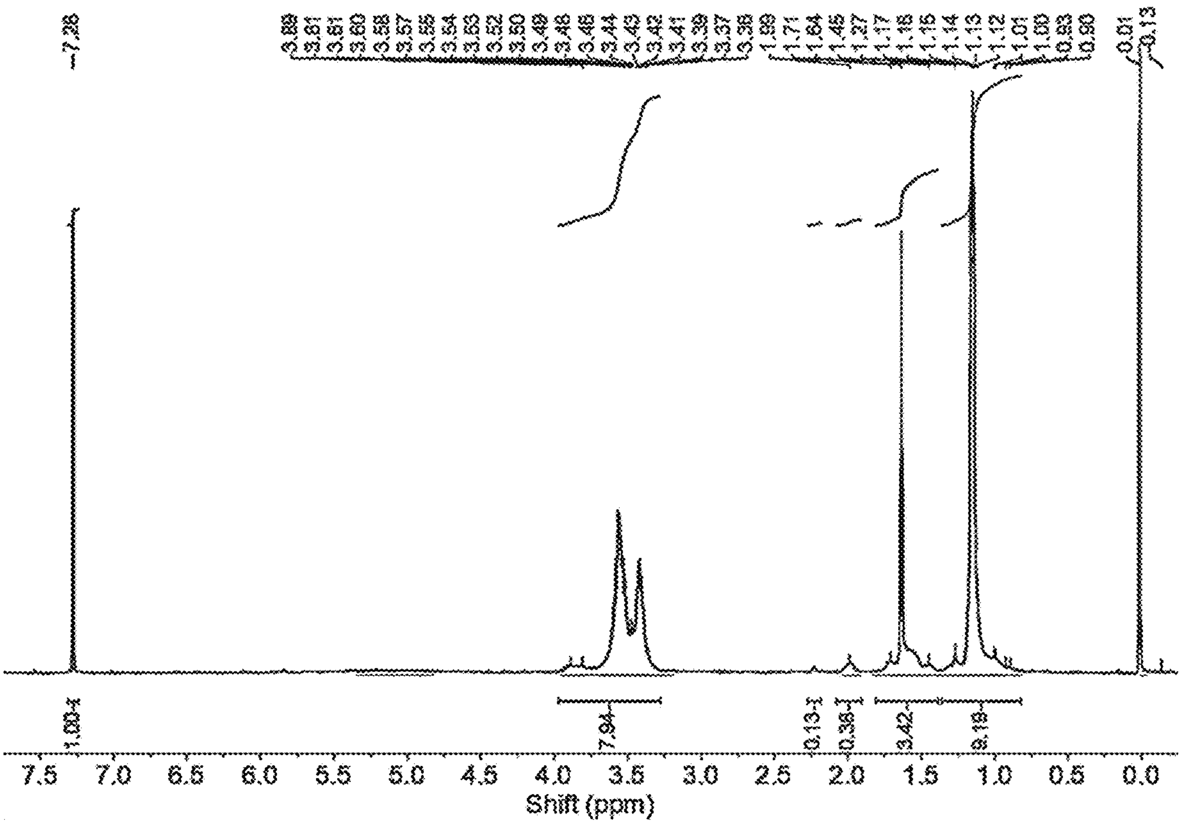
FIG. 2 is the NMR hydrogen spectrum of the hot melt adhesive prepared in Example 2 of the present invention.

FIG. 2 is the NMR hydrogen spectrum of the hot melt adhesive prepared in this example.

Example 3

A method for preparing a supramolecular hot melt adhesive material with high strength, super toughness, and self-healing ability comprises the following steps:

S1. D2000 and D400 were completely dissolved in N,N'-dimethylformamide, and the mixture was removed off air bubbles, and then added with a small amount of catalyst and an excess amount of dicyclohexyl methane 4,4'-diisocyanate for reaction at 60° C. for 30 min to obtain an oligomer with isocyanate at both ends;

S2. 2-amino-4-hydroxyl-6-methylpyrimidine was dissolved in N,N'-dimethylformamide, and then the mixture was added to the S1 solution to react with isocyanate at a temperature consistent with S1 for 2 h;

S3. Tris(2-aminoethyl)amine was added to the S2 solution to react with isocyanate at a temperature consistent with S2 for 6 h;

S4. After the reaction of S3 was completed, the solution was poured into a mold, and the solvent was fully volatilized to obtain a supramolecular thermoplastic elastomer material with super toughness and self-healing ability;

wherein, in S1, a molar ratio of the D2000 to the D400 was 1:1;

wherein, in S1, a molar ratio of the sum of the amount of substance of D2000 and D400 to the dicyclohexyl methane 4,4'-diisocyanate was 6:7;

wherein, in S2, a molar ratio of the 2-amino-4-hydroxyl-6-methylpyrimidine to the sum of the amount of substance of D2000 and D400 was 1:6;

wherein, in S3, a molar ratio of the tris(2-aminoethyl) amine to the sum of the amount of substance of D2000 and D400 was 1:18.

The supramolecular hot melt adhesive obtained in this example has a molecular formula shown as follows:

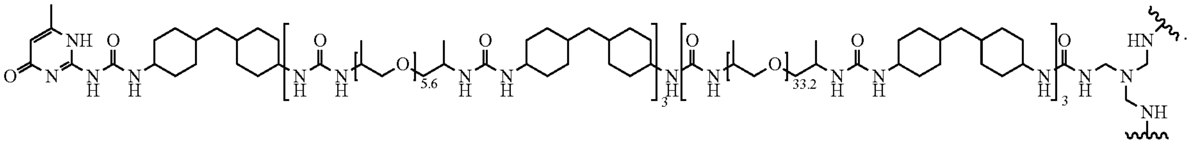

Figure 3:
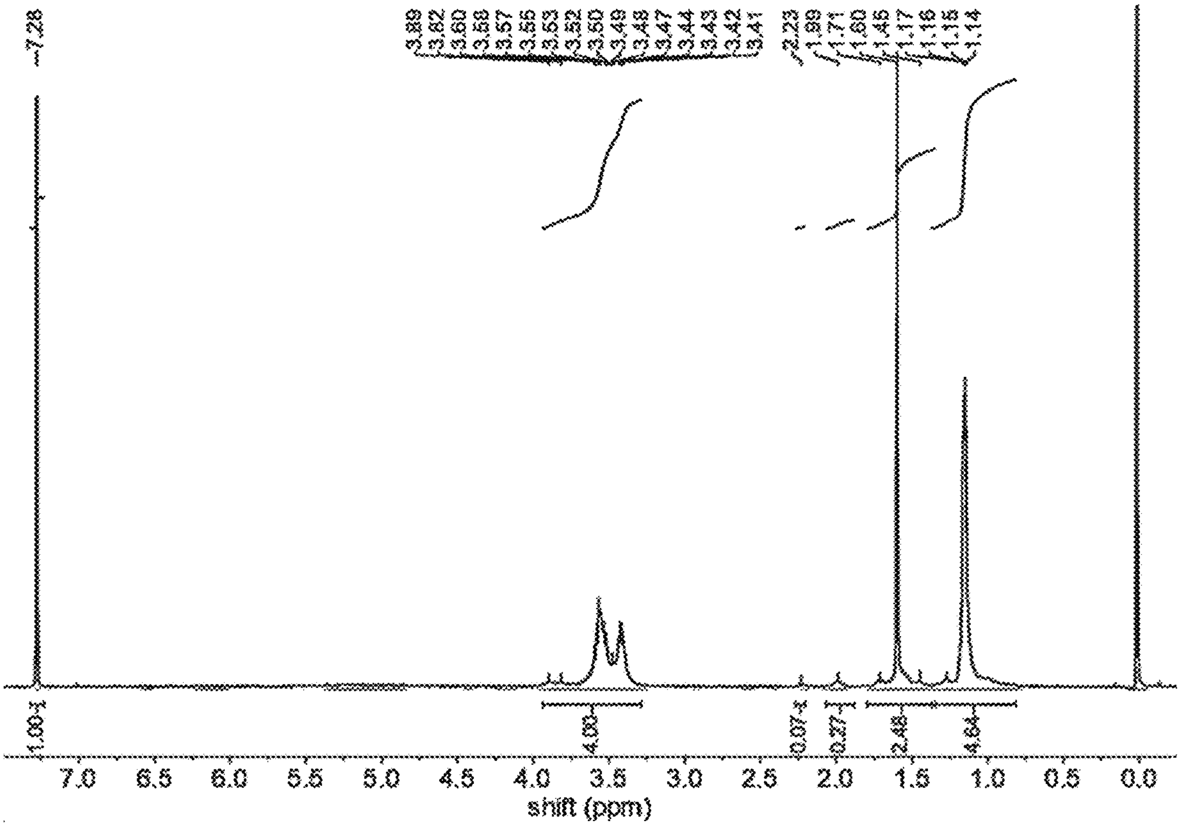
FIG. 3 is the NMR hydrogen spectrum of the hot melt adhesive prepared in Example 3 of the present invention.

FIG. 3 is the NMR hydrogen spectrum of the hot melt adhesive prepared in this example.

Figure 4:
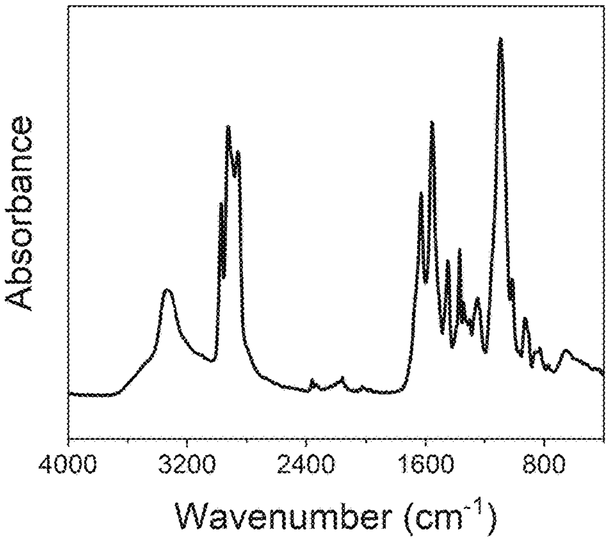
FIG. 4 is the Fourier transform infrared spectrum of the hot melt adhesive prepared in Example 4 of the present invention.

FIG. 4 is the Fourier transform infrared spectrum of the hot melt adhesive prepared in this example.

Example 4

A method for preparing a supramolecular hot melt adhesive material with high strength, super toughness, and self-healing ability comprises the following steps:

S1. D2000 and D400 were completely dissolved in N,N'-dimethylformamide, and the mixture was removed off air bubbles, and then added with a small amount of catalyst and an excess amount of dicyclohexyl methane 4,4'-diisocyanate for reaction at 60° C. for 30 min to obtain an oligomer with isocyanate at both ends;

S2. 2-amino-4-hydroxyl-6-methylpyrimidine was dissolved in N,N'-dimethylformamide, and then the mixture was added to the S1 solution to react with isocyanate at a temperature consistent with S1 for 2 h;

S3. Tris(2-aminoethyl)amine was added to the S2 solution to react with isocyanate at a temperature consistent with S2 for 6 h;

S4. After the reaction of S3 was completed, the solution was poured into a mold, and the solvent was fully volatilized to obtain a supramolecular thermoplastic elastomer material with super toughness and self-healing ability;

wherein, in S1, a molar ratio of D2000 to D400 was 1:1;

wherein, in S1, a molar ratio of the sum of the amount of substance of D2000 and D400 to the dicyclohexyl methane 4,4'-diisocyanate was 4:5;

wherein, in S2, a molar ratio of the 2-amino-4-hydroxyl-6-methylpyrimidine to the sum of the amount of substance of D2000 and D400 was 1:4;

wherein, in S3, a molar ratio of the tris(2-aminoethyl) amine to the sum of the amount of substance of D2000 and D400 was 1:12.

The supramolecular hot melt adhesive obtained in this example has a molecular formula shown as follows:

Example 5

A method for preparing a supramolecular hot melt adhesive material with high strength, super toughness, and self-healing ability comprises the following steps:

S1. D2000 and D400 were completely dissolved in N,N'-dimethylformamide, and the mixture was removed off air bubbles, and then added with a small amount of catalyst and an excess amount of dicyclohexyl methane 4,4'-diisocyanate for reaction at 60° C. for 30 min to obtain an oligomer with isocyanate at both ends;

S2. 2-amino-4-hydroxyl-6-methylpyrimidine was dissolved in N,N'-dimethylformamide, and then the mixture was added to the S1 solution to react with isocyanate at a temperature consistent with S1 for 2 h;

S3. Tris(2-aminoethyl)amine was added to the S2 solution to react with isocyanate at a temperature consistent with S2 for 6 h;

S4. After the reaction of S3 was completed, the solution was poured into a mold, and the solvent was fully volatilized to obtain a supramolecular thermoplastic elastomer material with super toughness and self-healing ability;

wherein, in S1, a molar ratio of D2000 to D400 was 1:1;

wherein, in S1, a molar ratio of the sum of the amount of substance of D2000 and D400 to the dicyclohexyl methane 4,4'-diisocyanate was 2:3;

wherein, in S2, a molar ratio of the 2-amino-4-hydroxyl-6-methylpyrimidine to the sum of the amount of substance of D2000 and D400 was 1:2;

wherein, in S3, a molar ratio of the tris(2-aminoethyl) amine to the sum of the amount of substance of D2000 and D400 was 1:10.

The supramolecular hot melt adhesive obtained in this example has a molecular formula shown as follows:

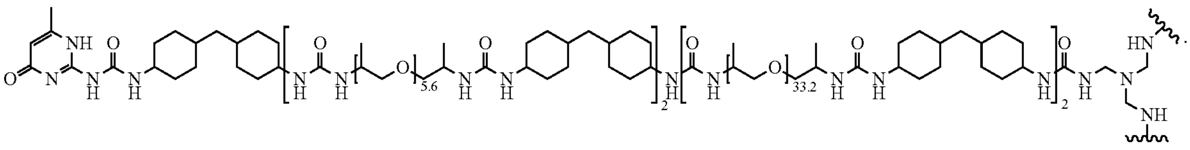

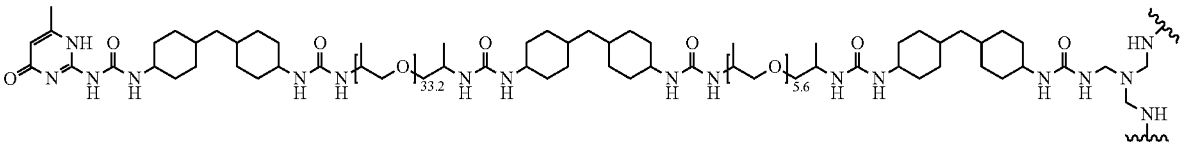

Figure 5:
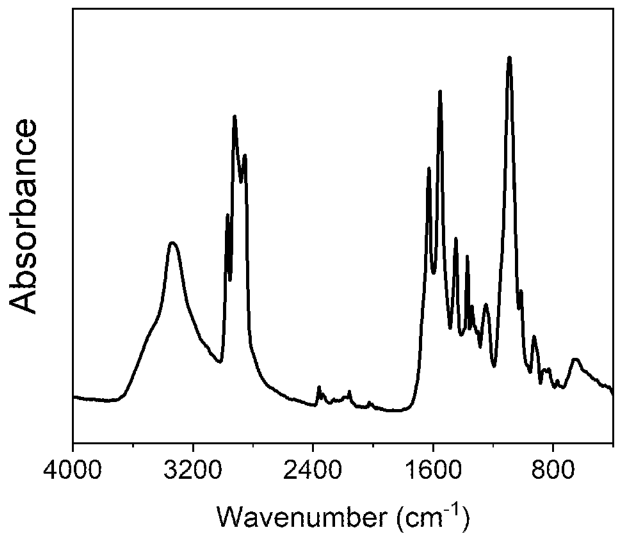
FIG. 5 is the Fourier transform infrared spectrum of the hot melt adhesive prepared in Example 5 of the present invention.

FIG. 5 is the Fourier transform infrared spectrum of the hot melt adhesive prepared in this example.

Example 6

A method for preparing a supramolecular thermoplastic elastomer material with high strength, super toughness, and self-healing ability comprises the following steps:

S1. D2000 and D400 were dissolved in N,N'-dimethylformamide, and the mixture was removed off air bubbles, and then added with a small amount of catalyst and an excess amount of dicyclohexyl methane 4,4'-diisocyanate for reaction at 60° C. for 30 min to obtain an oligomer with isocyanate at both ends;

S2. 2-amino-4-hydroxyl-6-methylpyrimidine was dissolved in N,N'-dimethylformamide, and then the mixture was added to the S1 solution to react with isocyanate at a temperature consistent with S1 for 2 h;

S3. Tris(2-aminoethyl)amine was added to the S2 solution to react with isocyanate at a temperature consistent with S2 for 6 h;

S4. After the reaction of S3 was completed, the solution was poured into a mold, and the solvent was fully volatilized to obtain a supramolecular thermoplastic elastomer material with super toughness and self-healing ability;

wherein, in S1, a molar ratio of D2000 to D400 was 1:2;

wherein, in S1, a molar ratio of the sum of the amount of substance of D2000 and D400 to the dicyclohexyl methane 4,4'-diisocyanate was 6:7;

wherein, in S2, a molar ratio of the 2-amino-4-hydroxyl-6-methylpyrimidine to the sum of amount of substance of D2000 and D400 was 1:6;

wherein, in S3, a molar ratio of the tris(2-aminoethyl) amine to the sum of the amount of substance of D2000 and D400 was 1:18.

Figure 6:
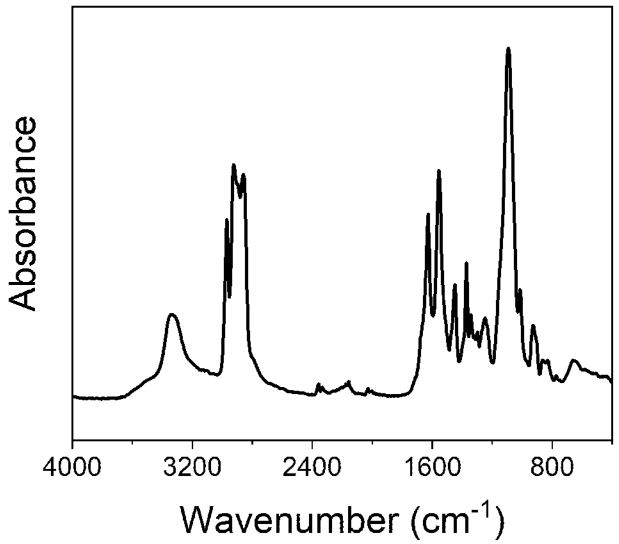
FIG. 6 is the Fourier transform infrared spectrum of the hot melt adhesive prepared in Example 6 of the present invention.
Figure 11:
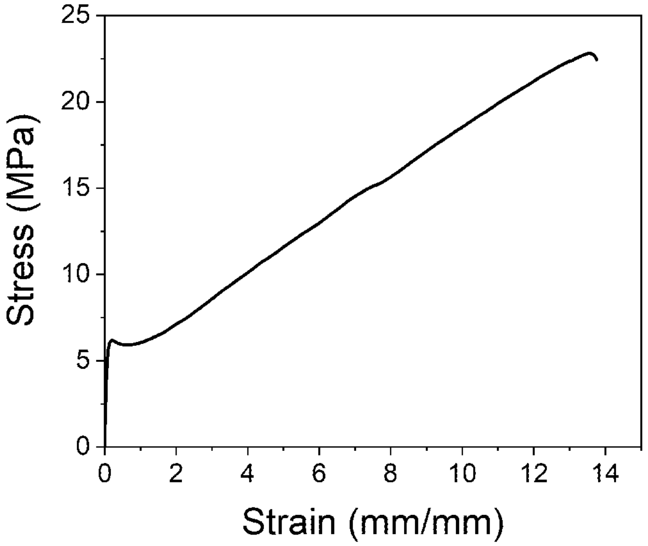
FIG. 11 is the stress-strain curve of the hot melt adhesive prepared in Example 6 of the present invention.

The supramolecular hot melt adhesive obtained in this example has a molecular formula shown as follows:

FIG. 6 is the Fourier transform infrared spectrum of the hot melt adhesive prepared in this example. FIG. 11 is the stress-strain curve of the hot melt adhesive prepared in this example.

Example 7

A method for preparing a supramolecular thermoplastic elastomer material with high strength, super toughness, and self-healing ability comprises the following steps:

S1. Polytetrahydrofuran diol and D400 were dissolved in N,N'-dimethylformamide, and the mixture was removed off air bubbles, and then added with a small amount of catalyst and an excess amount of dicyclohexyl methane 4,4'-diisocyanate for reaction at 60° C. for 30 min to obtain an oligomer with isocyanate at both ends;

S2. 2-amino-4-hydroxyl-6-methylpyrimidine was dissolved in N,N'-dimethylformamide, and then the mixture was added to the S1 solution to react with isocyanate at a temperature consistent with S1 for 2 h;

S3. Tris(2-aminoethyl)amine was added to the S2 solution to react with isocyanate at a temperature consistent with S2 for 6 h;

S4. After the reaction of S3 was completed, the solution was poured into a mold, and the solvent was fully volatilized to obtain a supramolecular thermoplastic elastomer material with super toughness and self-healing ability;

wherein, in S1, a molar ratio of the polytetrahydrofuran diol to D400 was 1:2;

wherein, in S1, a molar ratio of the sum of the amount of substance of the polytetrahydrofuran diol and D400 to the dicyclohexyl methane 4,4'-diisocyanate was 6:7;

wherein, in S2, a molar ratio of the 2-amino-4-hydroxyl-6-methylpyrimidine to the sum of the amount of substance of polytetrahydrofuran diol and D400 was 1:6;

wherein, in S3, a molar ratio of the tris(2-aminoethyl) amine to the sum of the amount of substance of the polytetrahydrofuran diol and D400 was 1:18.

The supramolecular hot melt adhesive obtained in this example has a molecular formula shown as follows:

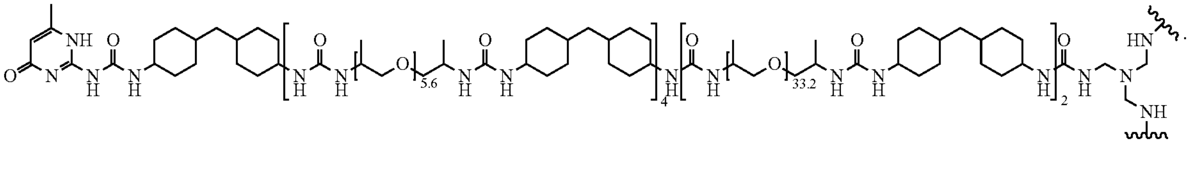

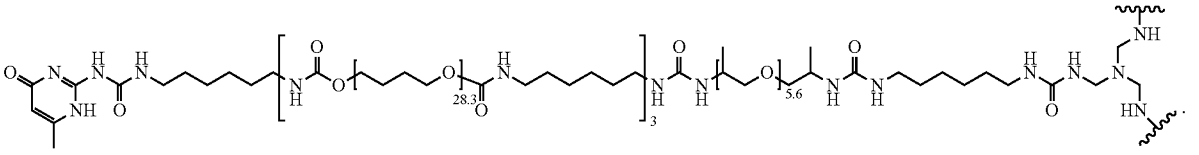

Figure 7:
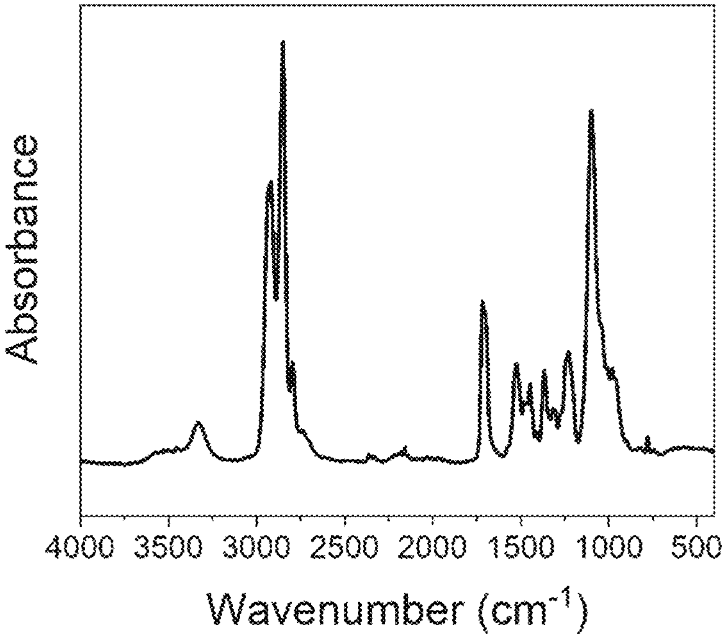
FIG. 7 is the Fourier transform infrared spectrum of the hot melt adhesive prepared in Example 7 of the present invention.

FIG. 7 is the Fourier transform infrared spectrum of the hot melt adhesive prepared in this example.

Example 8

A method for preparing a supramolecular thermoplastic elastomer material with high strength, super toughness, and self-healing ability comprises the following steps:

S1. Polytetrahydrofuran diol and D400 were dissolved in N,N'-dimethylformamide, and the mixture was removed off air bubbles, and then added with a small amount of catalyst and an excess amount of hexamethylene diisocyanate for reaction at 60° C. for 30 min to obtain an oligomer with isocyanate at both ends;

S2. 2-amino-4-hydroxyl-6-methylpyrimidine was dissolved in N,N'-dimethylformamide, and then the mixture was added to the S1 solution to react with isocyanate at a temperature consistent with S1 for 2 h;

S3. Tris(2-aminoethyl)amine was added to the S2 solution to react with isocyanate at a temperature consistent with S2 for 6 h;

S4. After the reaction of S3 was completed, the solution was poured into a mold, and the solvent was fully volatilized to obtain a supramolecular thermoplastic elastomer material with super toughness and self-healing ability;

wherein, in S1, a molar ratio of the polytetrahydrofuran diol to D400 was 2:1;

wherein, in S1, a molar ratio of the sum of the amount of substance of the polytetrahydrofuran diol and D400 to the hexamethylene diisocyanate was 3:4;

wherein, in S2, a molar ratio of the 2-amino-4-hydroxyl-6-methylpyrimidine to the sum of the amount of substance of the polytetrahydrofuran diol and D400 was 1:3;

wherein, in S3, a molar ratio of the tris(2-aminoethyl) amine to the sum of the amount of substance of the polytetrahydrofuran diol and D400 was 1:6.

Figure 8:
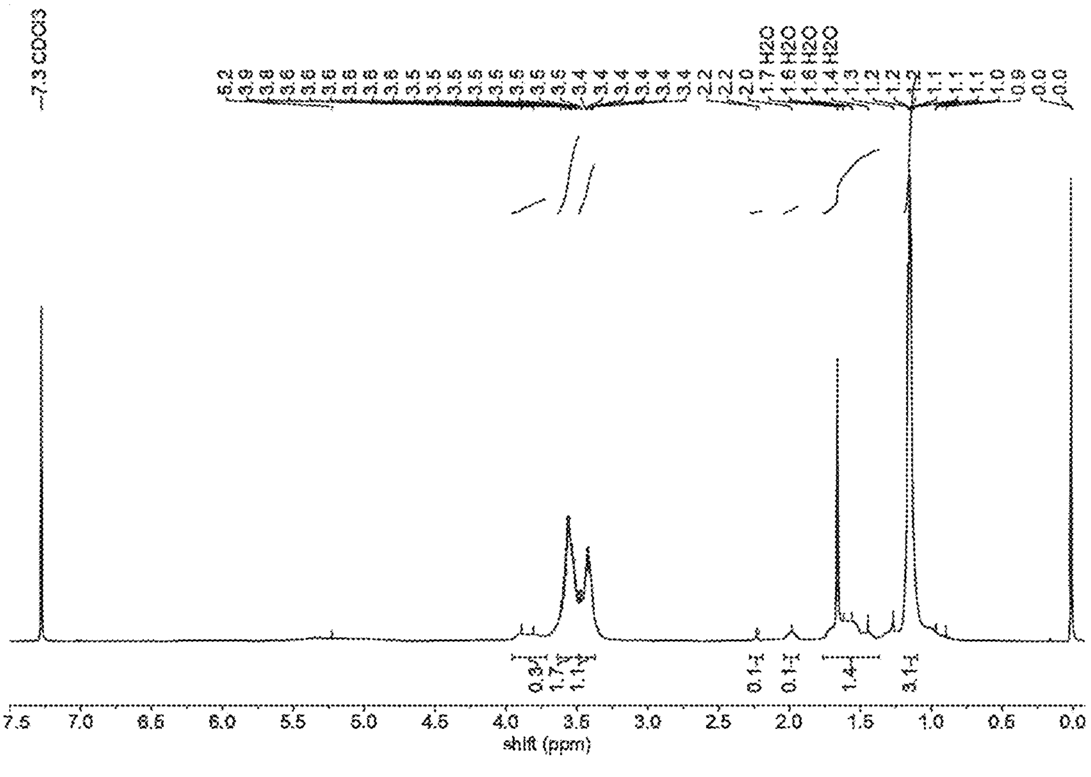
FIG. 8 is the NMR hydrogen spectrum of the hot melt adhesive prepared in Example 8 of the present invention.

The supramolecular hot melt adhesive obtained in this example has a molecular formula shown as follows:

FIG. 8 is the NMR hydrogen spectrum of the hot melt adhesive prepared in this example.

Example 9

A method for preparing a supramolecular thermoplastic elastomer material with high strength, super toughness, and self-healing ability comprises the following steps:

S1. Polytetrahydrofuran diol and double amino terminated polydimethylsiloxane were dissolved in N,N'-dimethylformamide, and the mixture was removed off air bubbles, and then added with a small amount of catalyst and an excess amount of hexamethylene diisocyanate for reaction at 60° C. for 30 min to obtain an oligomer with isocyanate at both ends;

S2. 2-amino-4-hydroxyl-6-methylpyrimidine was dissolved in N,N'-dimethylformamide, and then the mixture was added to the S1 solution to react with isocyanate at a temperature consistent with S1 for 2 h;

S3. Tris(2-aminoethyl)amine was added to the S2 solution to react with isocyanate at a temperature consistent with S2 for 6 h;

S4. After the reaction of S3 was completed, the solution was poured into a mold, and the solvent was fully volatilized to obtain a supramolecular thermoplastic elastomer material with super toughness and self-healing ability;

wherein, in S1, a molar ratio of the polytetrahydrofuran diol to the double amino terminated polydimethylsiloxane was 1:2;

wherein, in S1, a molar ratio of the sum of the amount of substance of the polytetrahydrofuran diol and double amino terminated polydimethylsiloxane to the hexamethylene diisocyanate was 6:7;

wherein, in S2, a molar ratio of the 2-amino-4-hydroxyl-6-methylpyrimidine to the sum of the amount of substance of the polytetrahydrofuran diol and double amino terminated polydimethylsiloxane was 1:6;

wherein, in S3, a molar ratio of the tris(2-aminoethyl) amine to the sum of the amount of substance of the polytetrahydrofuran diol and double amino terminated polydimethylsiloxane was 1:18.

The supramolecular hot melt adhesive obtained in this example has a molecular formula shown as follows:

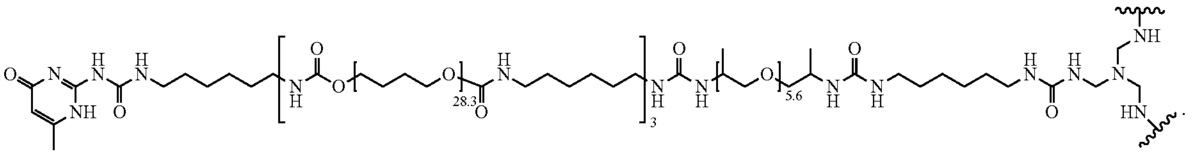

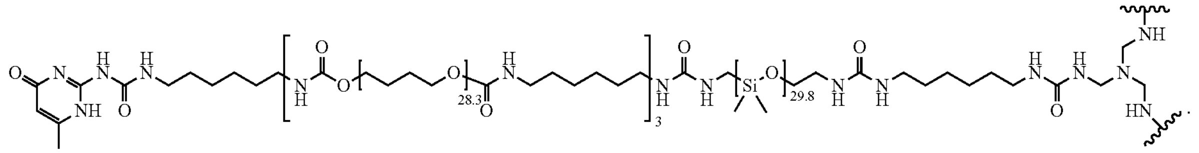

Figure 9:
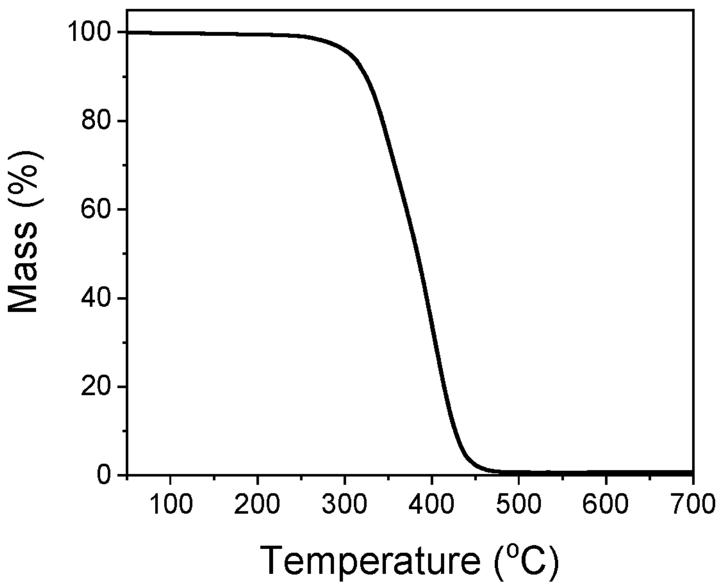
FIG. 9 is the thermogravity curve of the hot melt adhesive prepared in Example 9 of the present invention.

FIG. 9 is the thermogravity curve of the hot melt adhesive prepared in this example. It can be seen from FIG. 9 that this example had good thermal stability, and had a thermal decomposition temperature as high as 310° C.

Example 10

A method for preparing a supramolecular hot melt adhesive material with high strength, super toughness, and self-healing ability comprises the following steps:

S1. D2000 and D400 were completely dissolved in N,N'-dimethylformamide, and the mixture was removed off air bubbles, and then added with a small amount of catalyst and an excess amount of hexamethylene diisocyanate for reaction at 60° C. for 30 min to obtain an oligomer with isocyanate at both ends;

S2. 2-amino-4-hydroxyl-6-methylpyrimidine was dissolved in N,N'-dimethylformamide, and then the mixture was added to the S1 solution to react with isocyanate at a temperature consistent with S1 for 2 h;

S3. Tris(2-aminoethyl)amine was added to the S2 solution to react with isocyanate at a temperature consistent with S2 for 6 h;

S4. After the reaction of S3 was completed, the solution was poured into a mold, and the solvent was fully volatilized to obtain a supramolecular thermoplastic elastomer material with super toughness and self-healing ability;

wherein, in S1, a molar ratio of D2000 to D400 was 1:1;

wherein, in S1, a molar ratio of the sum of the amount of substance of D2000 and D400 to the hexamethylene diisocyanate was 4:5;

wherein, in S2, a molar ratio of the 2-amino-4-hydroxyl-6-methylpyrimidine to the sum of the amount of substance of D2000 and D400 was 1:4;

wherein, in S3, a molar ratio of the tris(2-aminoethyl) amine to the sum of the amount of substance of D2000 and D400 was 1:12.

The supramolecular hot melt adhesive obtained in this example has a molecular formula shown as follows:

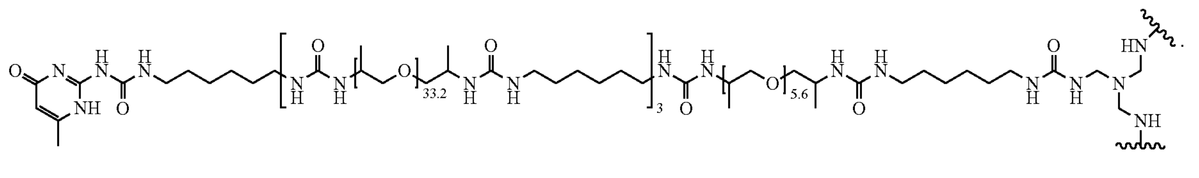

Figure 10:
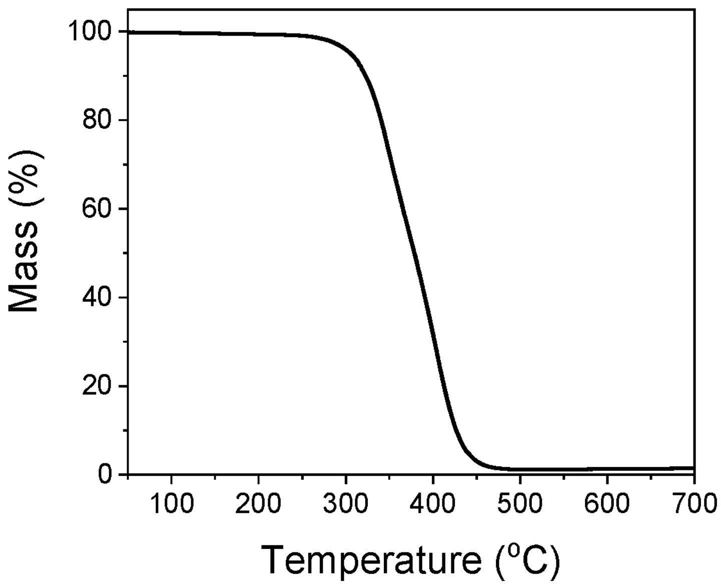
FIG. 10 is the thermogravity curve of the hot melt adhesive prepared in Example 10 of the present invention.
Figure 13:
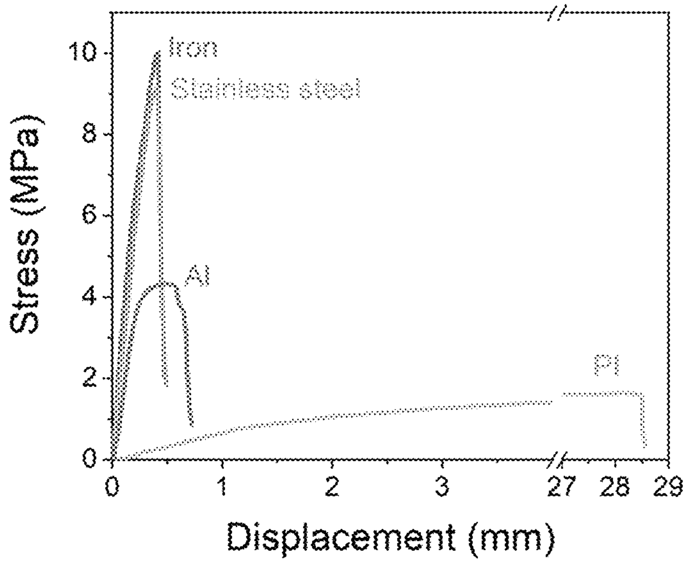
FIG. 13 is the Lap-shear stress-strain curve of the hot melt adhesive prepared in Example 10 of the present invention after being bound with iron sheet, stainless steel, aluminum, and polyimide.

FIG. 10 is the thermogravity curve of the hot melt adhesive prepared in this example. It can be seen from FIG. 10 that this example had good thermal stability, and had a thermal decomposition temperature as high as 310° C. FIG. 13 is the Lap-shear stress-strain curve of the hot melt adhesive prepared in this example after being bound with iron sheet, stainless steel, aluminum, and polyimide. It can be seen from FIG. 13 that all the bound samples can withstand deformation to a certain extent before broken, which showed obvious toughness fracture behavior, indicating that the hot melt adhesive of this example had excellent toughness. In addition, the hot melt adhesive bound with iron sheet or stainless steel had a binding strength of greater than 9 MPa, showing excellent binding ability.

The descriptions of the above examples are only used to help understand the method and core idea of the present invention. It should be noted that for those of ordinary skill in the art, several improvements and modifications can be made to the present invention without departing from the principle of the present invention, and these improvements and modifications also fall within the protection scope of the claims of the present invention.

The above description of the disclosed examples is provided to enable those skilled in the art to implement or use the present invention. Various modifications to these examples will be apparent to those skilled in the art. The general principles defined herein may be implemented in other embodiments without departing from the spirit or scope of the present invention. Therefore, the present invention will not be limited to the examples shown herein, but is to be accorded the widest scope consistent with the principles and novel features disclosed herein.

The invention claimed is:

1. A supramolecular hot melt adhesive as shown in formula (I), (I)

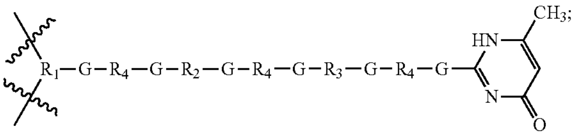

wherein, $R_1$ is a group of multifunctional crosslinking agent other than hydrogen; wherein the multifunctional crosslinking agent has a functionality of ≥3, and it is selected from the group consisting of tris(2-aminoethyl)amine, melamine, 2-hydroxyl-N,N-bis(2-hydroxyethyl)-N-methylethylammonium methyl sulfate and a mixture thereof;

G is a ureido group or a carbamate group;

$R_2$ and $R_3$ are groups of either or both of diamine oligomer and diol oligomer other than amino or/and hydrogen, and $R_2$ and $R_3$ can be the same or different;

$R_4$ is a group of diisocyanate other than an isocyanate group.

2. A method for preparing the supramolecular hot melt adhesive according to claim 1, comprises the steps of:

A) dissolving a diol oligomer or diamine oligomer in a solvent, and subjecting the mixture to react with diisocyanate under the action of a catalyst to obtain an initial reactant;

B) mixing 2-amino-4-hydroxyl-6-methylpyrimidine, the initial reactant and a solvent for reaction;

C) subjecting the reactant obtained in step B) to react with a multifunctional crosslinking agent to obtain a supramolecular hot melt adhesive;

wherein the multifunctional crosslinking agent has a functionality of ≥3, and it is selected from the group consisting of tris(2-aminoethyl)amine, melamine, 2-hydroxyl-N,N-bis(2-hydroxyethyl)-N-methylethylammonium methyl sulfate and a mixture thereof.

3. The method according to claim 2, wherein the diol oligomer is selected from the group consisting of polycaprolactone diol, polytetrahydrofuran diol, double hydroxyl terminated polyethylene glycol, double hydroxyl terminated polypropylene glycol, double hydroxyl terminated polydimethylsiloxane and a mixture thereof, and has a number-average molecular weight of 200-5000 g/mol; the diamine oligomer is selected from the group consisting of polyetheramine, double amino terminated polydimethylsiloxane and a mixture thereof, and has a number-average molecular weight of 200-5000 g/mol; the isocyanate is selected from the group consisting of isophorone diisocyanate, hexamethylene diisocyanate, trimethylhexadimethyl diisocyanate, dicyclohexyl methane 4,4'-diisocyanate, p-phenylene diisocyanate, toluene diisocyanate and a mixture thereof; and a molar ratio of the diol compound or diamine compound to the diisocyanate is (1-20):(2-21).

4. The method according to claim 2, wherein in step A), the catalyst is selected from dibutyltin dilaurate, and an amount of the catalyst is equal to or less than 1 wt % of the raw material in the reaction in step A).

5. The method according to claim 2, wherein a molar ratio of the 2-amino-4-hydroxyl-6-methylpyrimidine to the diol oligomer or diamine oligomer is (0.05-10):(0.1-20).

6. The method according to claim 2, wherein a molar ratio of the multifunctional crosslinking agent to the diol oligomer or the diamine oligomer is (0.01-5):(1-20).

7. The method according to claim 2, wherein in step A), the solvent is selected from the group consisting of N,N'-dimethylformamide, N,N'-dimethylacetamide, tetrahydrofuran and a mixture thereof, and the reaction is carried out at 40-100° C. for 5-120 min.

8. The method according to claim 2, wherein in step B), the reaction is carried out at 40-100° C. for 1-3 h.

9. The method according to claim 2, wherein in step C), the reaction is carried out at 40-100° C. for 6-12 h.

* * * * *